United States Patent [19]

Henderson et al.

[11] Patent Number: 5,030,332

[45] Date of Patent: Jul. 9, 1991

[54] METHOD FOR MAKING MAGNETIC OXIDE PRECIPITATES

[75] Inventors: Laura J. Henderson, Austin, Tex.; Benjamin L. Averbach, Belmont; Robert C. O'Handley, Andover, both of Mass.

[73] Assignee: Massachusetts Institute of Technology, Cambridge, Mass.

[21] Appl. No.: 511,109

[22] Filed: Apr. 19, 1990

[51] Int. Cl.$^5$ .............................................. C25F 5/00
[52] U.S. Cl. ................................... 204/146; 428/692; 428/694; 428/900; 252/62.59
[58] Field of Search ............... 428/692, 693, 694, 900; 252/62.58, 62.59; 204/146

[56] References Cited

U.S. PATENT DOCUMENTS

| | | | |
|---|---|---|---|
| 3,947,373 | 3/1976 | Sobajima et al. | 252/63.2 |
| 4,083,727 | 4/1978 | Andrus et al. | 106/39 |
| 4,133,677 | 1/1979 | Matsui et al. | 75/0.5 AA |
| 4,650,712 | 3/1987 | Hirose | 428/323 |
| 4,668,355 | 5/1987 | Lin | 204/146 |
| 4,690,768 | 9/1987 | Kamiyama | 252/62.58 |
| 4,697,744 | 10/1987 | Wada et al. | 241/20 |
| 4,698,140 | 10/1987 | Crane et al. | 204/146 |
| 4,814,239 | 3/1989 | Inoue et al. | 428/694 |
| 4,816,119 | 3/1989 | Rauch et al. | 204/29 |
| 4,816,311 | 3/1989 | Lenhart | 428/64 |
| 4,820,565 | 4/1989 | Funahashi et al. | 428/64 |
| 4,820,581 | 4/1989 | Saito et al. | 428/323 |
| 4,820,584 | 4/1989 | Morita et al. | 428/336 |

FOREIGN PATENT DOCUMENTS

| | | |
|---|---|---|
| 48-15759 | 2/1973 | Japan . |
| 55-129935 | 10/1980 | Japan . |
| 57-078631 | 5/1982 | Japan . |
| 58-006528 | 1/1983 | Japan . |
| 59-014608 | 1/1984 | Japan . |
| 60-129922 | 7/1985 | Japan . |
| 60-178607 | 9/1985 | Japan . |
| 61-080618 | 4/1986 | Japan . |
| 61-036048 | 8/1986 | Japan . |
| 62-042315 | 2/1987 | Japan . |
| 62-095735 | 5/1987 | Japan . |
| 62-125526 | 6/1987 | Japan . |
| 62-125533 | 6/1987 | Japan . |
| 62-241134 | 10/1987 | Japan . |
| 63-062205 | 3/1988 | Japan . |
| 63-017775 | 4/1988 | Japan . |
| 63-41852 | 8/1988 | Japan . |
| 63-00925 | 11/1988 | Japan . |

OTHER PUBLICATIONS

"Preparation of Acicular Hexagonal Ferrite Particles", M. Sugimoto et al., Fourth International Conference on Ferrites Part II Advances in Ceramics, 16, pp. 273-279 (1985).

"Magnetic Properties of Amorphous Spinel Ferrites", Mitsuo Sugimoto et al., Jpn. J. Appl. Phys., 21, pp. 197-198 (1982).

"A New Preparation Process of Cobalt Modified Iron Oxide", J. B. Monteil et al., Ferrites: Proceedings of the International Conference, pp. 532-536 (1980).

"Formation of Cobalt-Epitaxial Iron Oxides and Their Magnetic Properties", Fumitada Hayama et al., Fer- (List continued on next page.)

*Primary Examiner*—William R. Dixon, Jr.
*Assistant Examiner*—Chris Gallo
*Attorney, Agent, or Firm*—Choate, Hall & Stewart

[57] ABSTRACT

A mixture including at least one iron oxide and a non-magnetic matrix material is melted or vaporized and then heat is rapidly removed from the material. The resulting magnetic oxide precipitates are densely packed in the non-magnetic matrix. The precipitates have a narrow particle size distribution which results in a high signal-to-noise ratio when the oxides are used for magnetic recording purposes. The non-magnetic matrix can be removed to yield homogeneous, small particle iron oxide containing magnetic powder. Alternatively, the non-magnetic matrix/iron oxide material can be processed to yield a shaped recording medium.

43 Claims, 2 Drawing Sheets

OTHER PUBLICATIONS rites: Proceedings of the International Conference, pp. 521-525 (1980).

"The Development of Metal Powder for Magnetic Recording", Goro Akashi, Ferrites: Proceedings of the International Conference, pp. 548-552 (1980).

"Preparation of Amorphous Cobalt Ferrite Films With Perpendicular Anisotropy And Their Magnetooptical Properties", Nobuyuki Hiratsuka et al., IEEE Transactions On Magnetics, MAG-23, No. 5, pp. 3326-3328 (1987).

"Amorphous Cobalt Ferrite Films with High Perpendicular Anistropy", Nobuyuki Hiratsuka et al., Electronics and Communications In Japan, Part 2 71, pp. 95-102, No. 8 (1988).

"Dynamic Properties of Perpendicular Magnetic Recording Tape Coated with Acicular Ba-Ferrite Media", M. Sugimoto et al., IEEE J. On Magnetics in Japan, TJMJ-1, No. 9, pp. 1155-1156 (1985).

"Magnetic Inhomogeneities In BaO $B_2O_3$—$Fe_2O_3$ Oxide Glasses", R. K. MacCrone, Amorphous Magnetism, Proceedings of the International Symposium on Amorphous Magnetism, pp. 77-85 (1973).

"Magnetic properties, microstructure, and ultrastructure of partially Crystallised $B_2O_3$-BaO-$Fe_2O_3$ glass", M. Fahmy et al., Physics and Chemistry of Glasses, 13 No. 2, pp. 21-26 (1972).

"Magnetic, Electrical and Physical Properties of $Li_2O$-$Fe_2O_3$-$SiO_2$ Compositions", E. A. Weaver et al., J. Amer. Ceram. Soc. Bulletin, 52 No. 5, pp. 467-472 (1973).

"Structure et Mecanisme de Cristallisation des Produits Obtenus par Hyper-Tempedans les Systemes BaO-$Fe_2O_3$ et SrO-$Fe_2O_3$", J. B. Monteil et al., J. of Solid State Chemistry 25, pp. 1-8 (1978).

"Development and Application of Synthesizing Technique of Spinel Ferrites by the Wet Method", Toshio Takada, Ferrites: Proceedings of the International Conference, pp. 3-6 (1980).

"Elaboration par hypertrempe de verres comportant du ferrite de lithium", C. Chaumont et al., Rev. int. Htes Temp. et Refract., 15, pp. 23-32 (1978).

"Rapid Quenching On Ferrimagnetic Oxides", C. Chaumont et al., Rapidly Quenched Metals III, International Conference, 1, pp. 401-405 (1978).

"Magnetic Properties of $Fe^{3+}$ Cations Distributed In Lithium Borate Glasses" C. Chaumont et al., Mat. Res. Bull., 15, pp. 771-776 (1980).

"Proprietes Magnetiques De Nouvellas Phases Obtenues Par Hypertrempe A Haute Temperature", Bruno Monteil et al., Mat. Res. Bull., 12, pp. 235-240 (1977).

METHOD FOR MAKING MAGNETIC OXIDE PRECIPITATES

BACKGROUND OF THE INVENTION

This invention relates to methods for producing iron oxide particles in a solid non-magnetic matrix by rapid solidification of an iron oxide precursor mixed with a non-magnetic matrix material.

Oxide particles for magnetic recording purposes are currently synthesized using a very complex and lengthy procedure. This procedure requires the precipitation of synthetic $\alpha\text{-(FeO)OH}$(goethite) from aqueous solutions, the dehydration of $\alpha\text{-Fe}_2O_3$ to $Fe_3O_4$, and finally the careful oxidation of $Fe_2O_4$, to form $\gamma\text{-Fe}_2O_3$. (Akashi, Ferrites: *Proceedings of the International Conference*, Sept.–Oct. 1980 Japan p. 548–552).

Another wet chemistry technique for preparation of iron oxide (spinel ferrite) powders consists of precipitation of the spinel ferrite from aqueous solutions containing ferrous ions and other divalent metallic ions. The solution pH is controlled formed by oxidation of the aqueous solution in air above 50° C. (Takada, *Ferrites: Proceedings of the International Conference.* Sept.–Oct., 1980, Japan, p. 3–6).

Another wet chemical method for synthesis of iron oxide powders involves the reduction of ferrous ions with sodium borohydride, a very expensive reducing agent, in the presence of a magnetic field (Akashi, *Ferrites: Proceedings of the International Conference*, Sept.–Oct., 1980, Japan, p. 548–552).

It is also possible to prepare cobalt-ferrite iron oxide powders using wet chemistry methods. According to one such method, acicular $\gamma\text{-Fe}_2O_3$ particles are suspended in an alkaline solution containing $Co^{2+}$ and then treated at 90° C. for 10 hours (Hayama, *Ferrites: Proceedings of the International Conference*, Sept.–Oct., 1980, Japan, p. 521–525).

Alternative preparation methods for iron oxide powders include condensation of vaporized metal in a low pressure inert gas atmosphere in the presence of a magnetic field. Powders produced in this manner exhibit low noise levels and excellent stability against oxidation; however, this method is extremely expensive (Akashi, *Ferrites: Proceedings of the International Conference*, Sept.–Oct., 1980, Japan, p. 548–552).

Cobalt modified iron oxides may be prepared using pyrolytic decomposition (chemical vapor deposition) of cobalt-acetylacetonate vapor on the surface of iron oxide fluidized acicular particles. Powders prepared using this process are suitable for magnetic recording applications. They exhibit high coercivities (550–600 Oe) at relatively low $Co^{2+}$ (2-3) and $Fe^{2+}$ (8-9) wt % (Monteil et al. *Ferrites: Proceedings of the International Conference*, Sept.–Oct., 1980, Japan, p. 532–536).

Complex oxides for ferrites, consisting of iron oxide and zinc oxide, are prepared by spraying aqueous chloride solutions of the respective oxide metallic constituents onto a fluidized roasting furnace (Hirai et al. WO88-00925).

The iron oxide and doped iron oxide particles produced according to these methods are incorporated into magnetic discs, tapes and other devices for magnetic recording. Such magnetic recording media usually consist of a non-magnetic support for a magnetic recording layer of ferromagnetic powder (i.e. iron oxide or doped iron oxide) dispersed in an organic binder material (Saito et al., U.S. Pat. No. 4,820,581, JP 62125533, JP 57078631, JP 62241134, JP 62162228, and Funahashi et al. U.S. Pat. No. 4,820,565) where the non-magnetic support or substrate may be a polyester film or tape.

Efforts have also been directed towards improvement of durability of magnetic recording media. One approach involves the combination of cobalt doped $\gamma\text{-Fe}_2O_3$ and $Cr_2O_3$ with non-magnetic $\alpha$-iron oxide in an organic binder by ball milling subsequent coating of a PET film (JP 55129935).

Other approaches coat the magnetic iron oxide particles with a layer of silica ($SiO_2$) by sputtering (JP 58006528) or by immersing the metal oxide particle in a ph-controlled suspension with an amorphous, powdered silicate which is subsequently made crystalline by adjustment of the suspension ph. An alumina ($Al_2O_3$) protective coating may also be e-beam deposited on the surface of magnetic iron oxide particles (JP 58006528). A non-magnetic zinc oxide (ZnO) protective coating has also been electro-deposited on a magnetic iron oxide layer which had previously been electro-deposited on an aluminum or aluminum alloy substrate (JP 621255126).

Glass-forming additives such as $B_2O_3$, $Bi_2O_3$, $P_2O_5$, $MoO_3$ and $V_2O_5$ have been used in the solid state reaction of $\alpha$-FeOOH particles and colloidal $BaCo_3$ or $SrCO_3$.

Addition of approximately 0.5 wt % $B_2O_3$ best accelerated ferrite formation without adhesion of particles, resulting in thin-plate hexagonal ferrites with good magnetic recording properties (Sugimoto, *Fourth International Conference on Ferrites*, Part 2, Oct.–Nov. 1984, San Francisco, Calif., U.S.A. p. 273–279).

Amorphous cobalt ferrite ($CoFe_2O_4$) films have also been prepared using a two-source vacuum evaporation technique with $CoFe_2$ alloy and $P_2O_5$ as the source materials. These amorphous cobalt ferrite films display high perpendicular anisotropy (Hiratsuka et al., *Electronics and Communications in Japan*, Part 2, 71, 95–102 (1988) and *IEEE Transactions on Magnetics*, MAG-23, 3326–3328 (1987)).

Japanese patent, JP 61080618, also describes sputtering of $Co\text{-}\gamma\text{-Fe}_2O_3$ on a non-magnetic disc substrate. Japanese patent, JP 62095735, describes a process for conversion of sputtered $\alpha\text{-Fe}_2O_3$ to $Fe_3O_4$ on a non-magnetic substrate such as a drum or disc, using laser beam irradiation.

Methods exist for precipitation or nucleation of magnetic crystallites in glassy matrices.

U.S. Pat. No. 4,083,727 to Andrus et al. discloses a method for production of glass-ceramic articles having integral magnetic magnetite ($Fe_3O_4$) crystals. According to this method, a $Li_2O\text{—}FeO\text{—}Al_2O_3\text{—}SiO_2$ glass article nucleated with $TiO_2$ is heat-treated to induce crystalline nucleation within the article body, resulting in a glass-ceramic article which is subsequently exposed to a reducing atmosphere to convert hematite crystals in its surface layer to magnetite, yielding films with high coercivities and saturation magnetizations which compare favorably to those of magnetite and other ceramic ferrite materials. The magnetic recording medium disclosed in JP 62042315 consists of a layered structure, one layer of which is a magnetic recording medium made from $\alpha\text{-FeO}_2O_3$, $Al_2O_3$, $SiO_2$, $B_2O_3$ or $Co_3O_4$.

The nucleation of inhomogeneous precipitates having ferrimagnetic cores within antiferromagnetic skins has been observed in $B_2O_3\text{—}BaO\text{—}Fe_2O_3$ glass matrices prepared by slow quenching between stainless steel slabs (Fahmy et al., Physics And Chemistry Of Glasses, 13, 21-26 (1972) and MacCrone, in *Amorphous Magnetism*, H. O. Hooper and A. M. deGraaf, eds., Plenum Press, New York-London 1973 p. 77).

Magnetic phases have been precipitated in $Li_2B_2O_4$—$LiFe_5O_8$ glass systems prepared by splat quenching, roller quenching and gun quenching techniques (Chaumont et al., Mat. Res. Bull. 15, 771-776 (1980); Chaumont et al., *Rapidly Quenched Metals III*, Third International Conference, University of Sussex, Brighton, July 1978 p. 401; Chaumont et al., Rev. Int. Htes. Temp. et Refract. 15, 23-32 (1978)).

Partially recrystallized glasses in the $Li_2O$—$Fe_2O_3$-$SiO_2$ system, prepared by slow quenching between steel plates exhibit some ferrimagnetic properties at high $Fe_2O_3$ contents (Weaver et al., American Ceramic Society Bulletin 52, 467-472 (1973)).

Ferrimagnetic amorphous cobalt ferrites have been prepared by rapid quenching to liquid nitrogen temperatures of cobalt ferrite combined with $P_2O_5$ glass network former (Sugimoto et al., Jpn. J. Apl. Phys. 21, 197-198 (1982)).

Splat quenching techniques have been applied to the $BaO$—$Fe_2O_3$ and $SrO$—$Fe_2O_3$ systems where $BaFe_{12}O_{19}$ crystals have been observed along with weak ferromagnetism in the glass matrix (Monteil et al., Mat. Res. Bull. 12, 235-240 (1977); Monteil et al., Journal of Solid State Chemistry, 25, 1-8 (1978); Chaumont et al., Mat. Res. Bull. 15, 771-776 (1980); Chaumont et al., *Rapidly Quenched Metals III*, Third International Conference, University of Sussex, Brighton, July 1978 p. 401; Chaumont et al., Rev. Int. Htes. Temp. et Refract. 15, 23-32 (1978)).

SUMMARY OF THE INVENTION

According to one aspect of the invention, the simplified method for producing iron oxide containing magnetic oxide precipitates embedded in a non-magnetic matrix includes forming a mixture including at least one iron oxide precursor and a non-magnetic matrix material. This mixture is vaporized or melted and then subjected to rapid heat removal, by either condensation from the vapor in sputtering processes or rapid solidification in quenching from a melt. Such materials are well suited for applications in magnetic recording media and other magnetic components.

In one embodiment, rapid heat removal occurs by rapid solidification specifically by a double-roller quenching technique where the cooling rate is greater than $10^3 K$ per second and is preferably in the range $10^5$-$10^6 K$ per second. The mixture may be made by comminuting the iron oxide precursor and matrix material to form a powder and then pressing and sintering the powder before it is melted and rapidly solidified. The mixture can include $\alpha$-$Fe_2O_3$ and $SiO_2$ Other glass network formers such as $B_2O_3$, $P_2O_5$, $GeO_2$, $As_2O_5$, $Sb_2O_5$ or $Zr_2O_5$ can be matrix materials.

In another embodiment, an oxide such as $Fe_3O_4$ and a matrix material such as $SiO_2$ are ball-milled in acetone, dried, pressed into rods, and sintered in flowing $0_2$ to produce the starting mixture. CoO or other transition metal oxides such as $Sc_2O_3$, $TiO_2$, $V_2O_5$, $CrO_3$, $MnO_7$, NiO, CuO or ZnO or rare earth oxides may also be included in the mixture.

In another embodiment, thin film cobalt ferrite within a glass former matrix may be sputtered so that the film material rapidly condenses from the vapor phase at heat removal rates of typically $10^{12°}$/second, rates much greater than those possible by rapid solidification from a liquid melt.

According to another aspect of the invention, iron oxide containing magnetic oxide powder is produced by forming a mixture which includes at least one iron oxide and a matrix material. This mixture is melted and then rapidly solidified to form an iron oxide/matrix solid. The matrix material is then removed and the iron oxide containing magnetic oxide powder is collected.

The oxide precipitates collected after rapid solidification and subsequent removal of the non-magnetic matrix material are equiaxed, isotropic particles of $\gamma$-$Fe_2O_3$.

According to another aspect of the invention, a shaped recording medium may be fabricated from magnetic oxide precipitates embedded in a non-magnetic matrix. The magnetic oxide precipitate containing iron oxide embedded in a non-magnetic matrix flakes can be crushed to a size suitable for powder processing and subsequently formed into thick self-supporting shaped articles which are sintered to yield magnetic recording media.

Alternatively, according to another aspect of the invention, shaped recording media are produced by removing the magnetic oxide containing iron oxide precipitates from the non-magnetic matrix and mixing them with binders and elastomers to make an unsintered sheet which can then be applied to a substrate. Such a structure can then be sintered to yield a thick recording film having the shape of the supporting substrate.

The magnetic oxide precipitates made according to the methods of the invention exhibit superior magnetic properties excellently suited for magnetic recording applications or fabrication of ferrite magnetic recording heads. In particular, the material consists of densely-packed, isolated individual Particles that do not clump, permitting high-density information storage. The materials are magnetically isotropic and are thus easy to align. Further, the material exhibits a narrow distribution of particle sizes which results in a high signal-to-noise ratio in a magnetic recording application.

The magnetic oxide Precipitates produced according to the methods of the invention may be removed from the non-magnetic matrix material by dissolution or crushing. They are collected and incorporated into conventional binders such as organic compounds for application to appropriately shaped substrates in fabrication of magnetic tapes, hard disks, floppy disks or drums usable for double sided recording.

The method of the present invention represents a major simplification over conventional methods for making iron oxide powders or shaped articles for magnetic recording purposes. The method is a relatively easily-controlled process with fewer steps than the presently known procedure. The raw materials are inexpensive and readily available. Further, the method is flexible, allowing the addition of transition metal elements such as cobalt or chromium, and rare earth elements.

DESCRIPTION OF THE PREFERRED EMBODIMENT

EXAMPLE 1

The samples used in the double roller quenching process to produce crystallites were made from powder mixtures that had been ball-milled for approximately eight hours in acetone, dried, and pressed into rods. These rods had a diameter of ⅜ inch and had lengths that varied from 1.5 to 2 inches. The resulting rods were sintered under flowing oxygen for a period of approximately five hours. The starting powder compositions are listed below in Table I along with the sintering temperatures and the phases present after sintering.

TABLE I

| Initial Composition | Sintering Temperature | Phases Present After Sintering |
|---|---|---|
| 82 wt % $Fe_3O_4$ + 18 wt % $SiO_2$ | 1435° C. | $\alpha - Fe_2O_3$ + $Fe_3O_4$ + cristobalite |
| 77 wt % $Fe_3O_4$ + 18 wt % $SiO_2$ + 5 wt % CoO | 950° C. | $\alpha - Fe_2O_3$ + $SiO_2$ + $Fe_3O_4$ |
| 46 wt % $Fe_3O_4$ + 26 wt % $SiO_2$ + 28 wt % CoO | 950° C. | $CoFe_2O_4$ + $(Co,Fe)_2O_3$ + glass |

It should be noted that the present invention can also be used to produce the magnetic precipitates directly from a starting mixture of $\alpha$-$Fe_2O_3$ and $SiO_2$.

Figure 1:
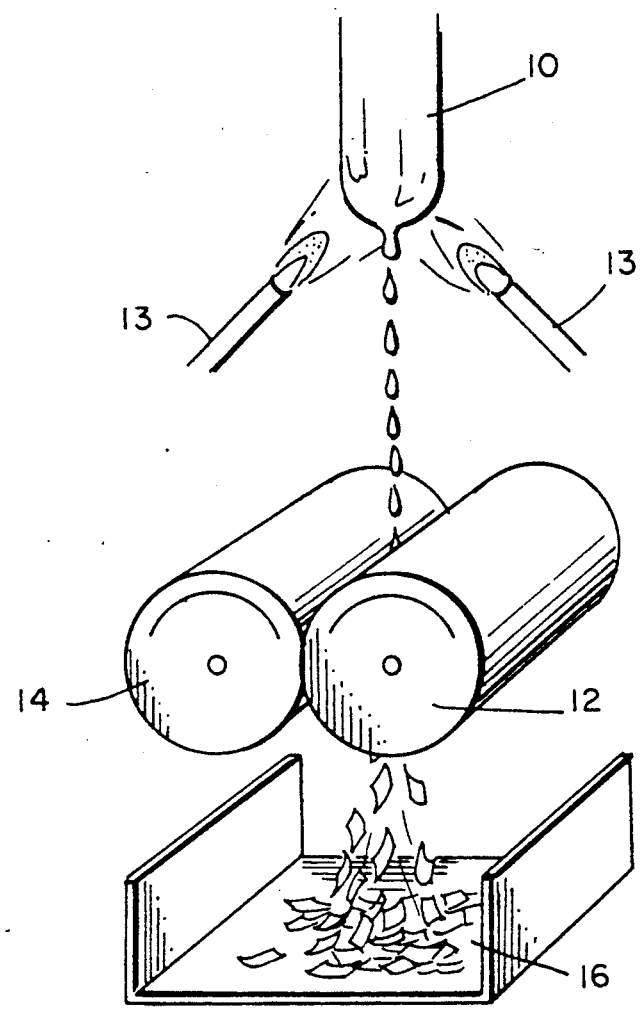
FIG. 1 is a schematic illustration of the double-roller rapid solidification method utilized in the practice of the invention.

The method according to the invention is illustrated in FIG. 1. Rod 10 of sintered precursor material was suspended above tool-steel rollers 12 that were held against one another by spring loaded bearings (not shown). The distance from the bottom of rod 10 to the rollers' surface was 10 centimeters. Rollers 12 were 10 centimeters in length and 5.5 centimeters in diameter and had a maximum rotation rate of 6,000 rpm in the direction given by arrows 15. Suspended rod 10 was melted in air using $H_2$—$O_2$ torches 13. Drops melted from rod 10 one-by-one were quenched into flakes as they passed through roller nip 14. Flakes 16 were collected in an aluminum basket 17 placed below rollers 12. Other rapid solidification techniques such as splat quenching, single roller quenching, the gun technique, and melt extraction can be used.

X-ray diffraction studies have been performed on the as-quenched samples. The flakes of the samples that contain zero- and 5-wt % CoO consisted of $\gamma$-$Fe_2O_3$, $Fe_3O_4$, or Berthollide oxide. The sample that contained 28 wt % CoO was composed of (Co,Fe)O and (Co,Fe)$_2O_3$. The magnetic properties of the as-quenched flakes are listed below in Table 2. Table 2 also lists two common magnetic recording materials for comparison. Note that the magnetic properties of the sample that included 5 wt % CoO in its starting mixture are comparable to those of currently used magnetic oxide media. Table 2 also lists the average size of the precipitates produced according to the method of the present invention.

TABLE 2

| Sample Starting Composition | Coercivity (OE.) | Specific Magnetization (EMU/G) | Edge Length (In A) |
|---|---|---|---|
| 82 wt % $Fe_3O_4$ + 18 wt % $SiO_2$ | 240 | 52 | 1500 |
| 77 wt % $Fe_3O_4$ + 18 wt % $SiO_2$ + 5 wt % CoO | 530 | 50 | 2000 |
| 46 wt % $Fe_3O_4$ + 26 wt % $SiO_2$ + 28 wt % CoO | 650 | 10 | 1600 |
| $Co_xFe_{2-x}O_3$ (x = 0.06) | 515 — 600 | 62 | Prior Art Materials |
| $(Co,Fe)_2O_3$— $(Co,Fe)_3O_4$ | 580 — 700 | 60 | |

Figure 2:
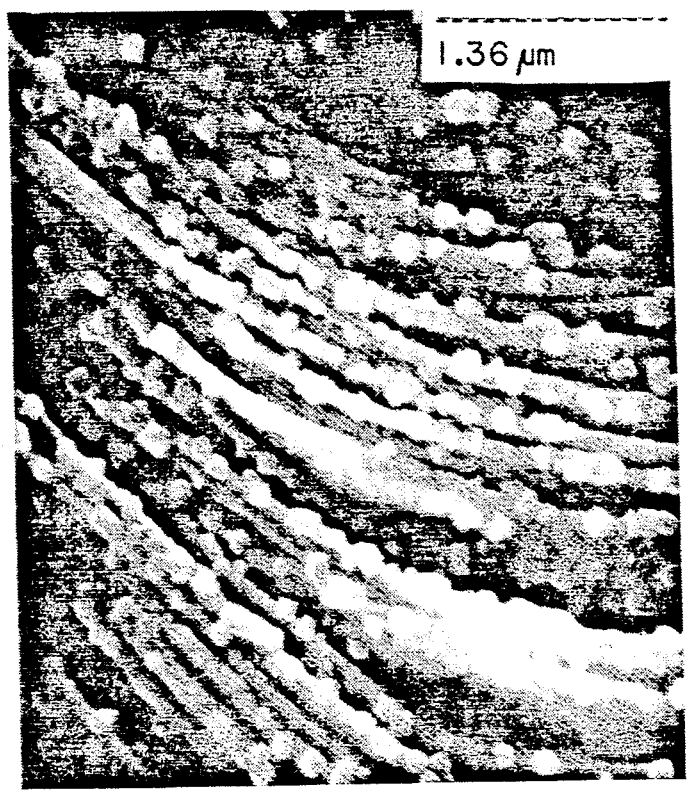
FIG. 2 is an SEM micrograph at 22,000× magnification of $Fe_2O_3$—$Fe_3O_4$ crystallites growing from glassy strands produced from a starting composition of 82 wt % $Fe_3O_4$ + $SiO_2$ prepared according to the method of the invention.
Figure 3:
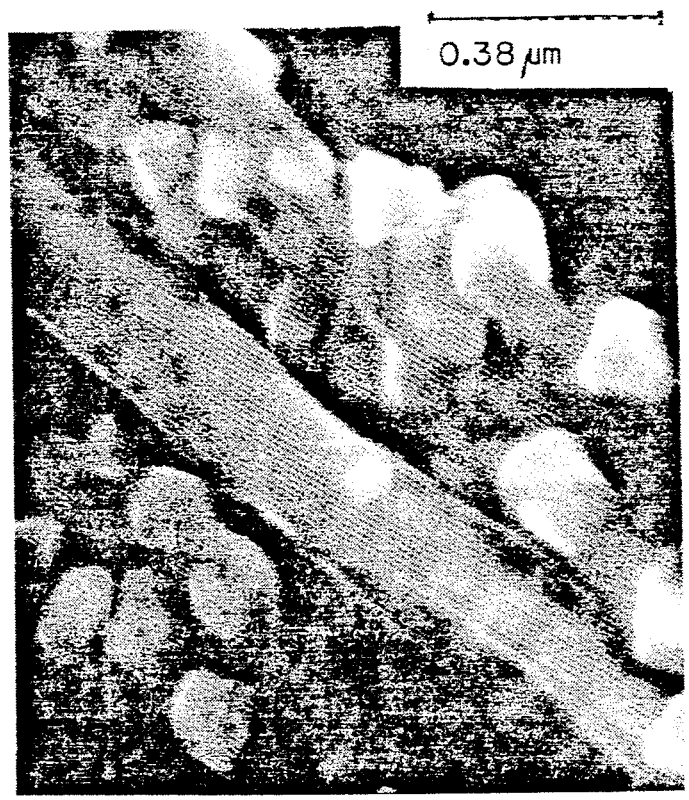
FIG. 3 is an SEM micrograph at 80,000× magnification of the same material as shown in FIG. 2.

Scanning electron microscope studies have revealed that all of the samples consist of uniformly sized, equi-axed precipitates that are embedded in a glassy matrix. In the case of the rapidly solidified $Fe_3O_4$+$SiO_2$, the precipitates are actually cubes. The edges of the precipitates are rounded, indicating that they are probably encased in glass. In many of the samples, strands of glass were present; these strands were sometimes twisted and usually had crystallites on them or within them, growing in an oriented manner along the strand. FIGS. 2 and 3 show strings of cubic $\gamma$-$Fe_2O_3$ particles in a matrix of $SiO_2$-rich glass. Each particle is approximately 0.1 mm on edge.

EXAMPLE 2

Iron oxide containing magnetic oxide powder can be produced from the flakes of Example 1 by chemical removal of the matrix material and collection of the remaining magnetic particles. Flakes may be reacted with a suitable etch solution selected to etch away the glass matrix while leaving intact the magnetic particles. The etch may be heated to an elevated temperature near the glass transition temperature of the glass matrix but well below the melting point of the magnetic oxide particles to accelerate the kinetics of the dissolution reaction.

The undissolved magnetic oxide particles can then be collected, washed to remove traces of etchant solution, and subjected to further processing. Such processing can include sintering or mixing with conventional organic binder materials, well known in the art.

EXAMPLE 3

Iron oxide powder may also be produced from the flakes of Example 1 by mechanically removing the glass matrix. The brittle flakes can be crushed and the magnetic iron oxide precipitate particles separated from the group glass matrix magnetically.

The resulting magnetic iron oxide precipitate particles can be processed further as described in Example 2.

EXAMPLE 4

Shaped magnetic recording media can be fabricated using the flakes prepared according to Example 1. The flakes may be crushed to a suitable size for powder processing i.e. reduced to micron sized particles. These particles can be formed into thick, self-supporting shaped articles, such as disks or drums and sintered. Disks made by this method offer the advantage of addressability from either side.

EXAMPLE 5

Alternatively, magnetic recording media can be made by applying inks containing magnetic iron oxide containing precipitate particles to shaped substrates. Iron oxide containing powders prepared according to the method outlined in Example 2 or 3 can be used to produce inks which can be painted on substrates having the desired shape and sintered to produce a thin solid recording layer.

Thick recording films can be made by combining the iron oxide containing powders of Example 2 or 3 with binders and elastomers to make a "green" i.e. unsintered sheet which can be applied to a substrate of the desired shape and then sintered.

EXAMPLE 6

Thin film magnetic recording media can be sputtered onto substrates selected for their shape and optical properties. Such condensation of materials from the vapor phase results in extremely high cooling rates on the order of $10^{12°}$/second and can be employed to deposit smooth surfaced 0.1 micron–10.0 micron cobalt ferrite glass matrix films.

Sputtering techniques can also be used to deposit magnetic iron oxide containing precipitates embedded in a glass matrix on metallic substrates having reflective properties suitable for optical recording based on the Faraday and Kerr effects.

What is claimed is:

1. A method for producing iron oxide containing magnetic oxide precipitates embedded in a non-magnetic glass matrix for recording media comprising:
   forming a mixture including at least one iron oxide and a matrix material;
   melting or vaporizing the mixture; and
   rapidly removing heat from the melted or vaporized mixture.

2. A method for producing iron oxide containing magnetic oxide powder comprising:
   forming a mixture including at least one iron oxide and a
   melting the mixture;
   rapidly removing heat from the melted mixture to form an iron oxide/matrix material solid;
   removing the matrix material; and
   collecting the iron oxide containing magnetic oxide particles.

3. A method for producing a recording medium from iron oxide containing magnetic oxide precipitates embedded in a non-magnetic matrix comprising:
   forming a mixture including at least one iron oxide and a matrix material;
   melting the mixture;
   rapidly removing heat from the melted mixture to form an iron oxide/matrix material solid;
   crushing the iron oxide/matrix material solid;
   forming the crushed iron oxide/matrix material into shaped articles;
   sintering the shaped articles to produce recording media.

4. A method for producing a recording medium from iron oxide containing magnetic oxide precipitates embedded in a non-magnetic matrix comprising:
   forming a mixture including at least one iron oxide and a matrix material;
   melting the mixture;
   rapidly removing heat from the melted mixture to form an iron oxide/matrix material solid;
   removing the matrix material;
   collecting the iron oxide containing magnetic oxide particles;
   combining the particles with a liquid dispersant to form an ink; and
   painting the ink on a shaped substrate to produce a recording medium.

5. A method for producing a recording medium from iron oxide containing magnetic oxide precipitates embedded in a non-magnetic matrix comprising:
   forming a mixture including at least one iron oxide and a matrix material:
   melting the mixture;
   rapidly removing heat from the melted mixture to form an iron oxide/matrix material solid;
   removing the matrix material;
   collecting the iron oxide containing magnetic oxide particles;
   combining the particles with binders and elastomers to produce a preform;
   applying the preform to a shaped substrate; and
   sintering the preform and shaped substrate to produce a magnetic recording medium.

6. A method according to claims 1, 2, 3, 4 or 5 wherein the matrix material comprises a glass network former.

7. The method according to claim 6 wherein the matrix material comprises one or more glass network formers selected from the group consisting of: $SiO_2$, $B_2O_3$, $P_2O_5$, $GeO_2$, $As_2O_5$, $Sb_2O_5$, or $Zr_2O_5$.

8. The method of claims 1, 2, 3, 4, or 5 wherein the matrix material comprises cristobalite.

9. The method of claims 1, 2, 3, 4, or 5 wherein the iron oxide comprises $\alpha\text{-}Fe_2O_3$.

10. The method of claims 1, 2, 3, 4, or 5 wherein the mixture comprises $\alpha\text{-}Fe_2O_3$ and $Fe_3O_4$.

11. The method of claims 1, 2, 3, 4, or 5 wherein the mixture further includes a transition metal oxide.

12. The method according to claim 11 wherein the transition metal oxide includes one or more transition metal oxides selected from the group consisting of: $Sc_2O_3$, $TiO_2$, $V_2O_5$, $CrO_3$, $MnO_7$, $CoO$, $NiO$, $CuO$, or $ZnO$.

13. The method according to claims 1, 2, 3, 4, or 5 wherein the mixture further includes a rare earth oxide.

14. The method according to claim 13 wherein the rare earth oxide includes one or more rare earth oxides selected from the group consisting of: cerium oxide, praseodymium oxide, meodymium oxide, promethium oxide, samarium oxide, europium oxide, gadolinium oxide, terbium oxide, dysprosium oxide, holmium oxide, erbium oxide, thulium oxide, ytterbium oxide or lutetium oxide.

15. The method of claims 1, 2, 3, 4, or 5 wherein the mixture is made by:
   comminuting the iron oxide and matrix material to form a powder; and
   pressing and sintering the powder.

16. The method according to claim 15 wherein the iron oxide and matrix material are comminuted by ball-milling.

17. The method according to claim 11 wherein the mixture is made by:
   comminuting the iron oxide, transition metal oxide and matrix material to form a powder;
   and pressing and sintering the powder.

18. The method according to claim 17 wherein the iron oxide, transition metal oxide and matrix material are comminuted by ball-milling.

19. The method according to claim 13 wherein the mixture is made by:

comminuting the iron oxide, rare earth oxide and matrix material to form a powder;
and pressing and sintering the powder.

20. The method according to claim 19 wherein the iron oxide, rare earth oxide and matrix material are comminuted by ball-milling.

21. The method according to claim 16 wherein the iron oxide and matrix material are ball-milled in acetone, dried, pressed into rods, and sintered in flowing $O_2$.

22. The method according to claim 18 wherein the iron oxide, transition metal oxide and matrix material are ball-milled in acetone, dried, pressed into rods, and sintered in flowing $O_2$.

23. The method according to claim 20 wherein the iron oxide, rare earth oxide and matrix material are ball-milled in acetone, dried, pressed into rods, and sintered in flowing $O_2$.

24. The method according to claim 21 wherein the iron oxide is $Fe_3O_4$, the matrix material is $SiO_2$, and sintering is at 1435° C.

25. The method according to claim 21 wherein the mixture further includes CoO and is sintered at 950° C.

26. The method of claims 1, 2, 3, 4, or 5 wherein the mixture comprises $CoFe_2O_4$, $(Co,Fe)_2O_3$ and a glass network former.

27. The method of claims 1, 2, 3, 4, or 5 wherein the rapid heat removal is effected by double roller quenching.

28. The method of claims 1, 2, 3, 4, or 5 wherein the mixture is melted with an $H_2$—$O_2$ torch.

29. The method of claims 1, 2, 3, 4, or 5 wherein the rapid heat removal is effected by the gun technique.

30. The method of claims 1, 2, 3, 4, or 5 wherein the rapid heat removal is effected by splat quenching.

31. The method of claims 1, 2, 3, 4, or 5 wherein the rapid heat removal is effected by single roller quenching.

32. The method of claims 1, 2, 3, 4, or 5 wherein the rapid heat removal is effected by melt extraction.

33. The method of claims 1, 2, 3, 4, or 5 wherein the rapid heat removal is effected by atomization.

34. The method of claims 1, 2, 3, 4, or 5 wherein the rapid heat removal is effected by melt spinning.

35. The method of claims 1, 2, 3, 4, or 5 wherein the rapid heat removal is effected by laser glazing.

36. The method of claim 1 wherein the rapid heat removal is effected by sputtering onto a substrate.

37. The method of claims 1, 2, 3, 4, or 5 wherein the rapid heat removal results in a cooling rate greater than $10^3$K per second.

38. The method of claim 1 wherein the rapid heat removal results in a cooling rate of approximately $10^{12}$K per second.

39. The method of claims 2, 4, or 5 wherein the matrix is removed by dissolution.

40. The method of claims 3, 4, or 5 wherein the shape of the recording medium is a disk.

41. The method of claims 3, 4 or 5 wherein the shape of the recording medium is a drum.

42. The method of claim 36 wherein the substrate is a metal.

43. The method of claims 1, 2, 3, 4, or 5 wherein the rapid heat removal results in a cooling rate in the range of $10^5$–$10^6$K per second.

* * * * *

UNITED STATES PATENT AND TRADEMARK OFFICE
CERTIFICATE OF CORRECTION

PATENT NO. : 5,030,332

DATED : July 9, 1991

INVENTOR(S) : Laura J. Henderson et al.

It is certified that error appears in the above-identified patent and that said Letters Patent is hereby corrected as shown below:

ON THE TITLE PAGE:

In the abstract, line 1, replace "mon-" with --non----.

Column 1, line 22: After "controlled" insert --by alkali addition and the spinel ferrite precipitates are--.

Column 2, line 64: Replace "$\alpha\text{-}FeO_2O_3$" with --$\alpha\text{-}Fe_2O_3$--.

Column 3, line 60: Replace "O2" with --$O_2$--.

Column 4, line 36: Replace "Particles" with --particles--.
line 42: Replace "Precipitates" with --precipitates--.

Column 7, claim 2, line 38: After "and a" insert --matrix material;--.

Column 8, claim 6, line 21: Replace "A" with --the--.

Column 8, claim 14, line 46: Replace "Meodymium" with --neodymium--.

UNITED STATES PATENT AND TRADEMARK OFFICE
CERTIFICATE OF CORRECTION

PATENT NO.   :   5,030,332
DATED        :   July 9, 1991
INVENTOR(S)  :   Laura J. Henderson et al.

It is certified that error appears in the above-identified patent and that said Letters Patent is hereby corrected as shown below:

Column 6, line 26:  Change "0.1 mm" to --0.1 micrometers--.

Signed and Sealed this

Twentieth Day of July, 1993

Attest:

MICHAEL K. KIRK

Attesting Officer         Acting Commissioner of Patents and Trademarks